United States Patent [19]

Lummes et al.

[11] Patent Number: 5,088,209
[45] Date of Patent: Feb. 18, 1992

[54] METROLOGICAL SCALE

[75] Inventors: Stephen E. Lummes, Stroud; Robert B. Morrison; Brian C. R. Henning, both of Avon, all of United Kingdom

[73] Assignee: Renishaw plc, Gloucestershire, United Kingdom

[21] Appl. No.: 473,984

[22] PCT Filed: Aug. 17, 1989

[86] PCT No.: PCT/GB89/01019
§ 371 Date: Aug. 19, 1990
§ 102(e) Date: Aug. 19, 1990

[87] PCT Pub. No.: WO90/02315
PCT Pub. Date: Mar. 8, 1990

[30] Foreign Application Priority Data
Aug. 19, 1988 [GB] United Kingdom ............... 8819723

[51] Int. Cl.⁵ .............................................. G01B 11/02
[52] U.S. Cl. ............................................ 33/707; 33/706; 33/493; 33/494; 72/198
[58] Field of Search ................. 33/488, 493, 494, 706, 33/707; 72/196, 198

[56] References Cited

U.S. PATENT DOCUMENTS

| | | | |
|---|---|---|---|
| 3,077,131 | 2/1963 | McShane | 72/198 |
| 3,653,245 | 4/1972 | Tishken | 72/198 |
| 4,017,367 | 4/1977 | Saunders . | |
| 4,368,632 | 1/1983 | Thrash et al. | 72/198 |
| 4,586,260 | 5/1986 | Baxter et al. | 33/706 |

FOREIGN PATENT DOCUMENTS 0317712  5/1989  European Pat. Off. .
8800331  1/1988  PCT Int'l Appl. .

OTHER PUBLICATIONS

Patent Abstracts of Japan, Publ. No. 58122103 "Rolling Method of Steel Plate Clad on One Side" Publication Date 7-83.

*Primary Examiner*—Thomas B. Will
*Attorney, Agent, or Firm*—Spencer & Frank

[57] ABSTRACT

An optical metrological scale produced by a rolling method, to give a profiled upper scale surface which is imparted by an embossing roller. To prevent uneven strains, which could affect the pitch of the scale, the support roller has a similar embossing profile, so that the lower side of the scale is also given a profiled surface. The embossing roller is freely rotatable, while the support roller is driven.

11 Claims, 1 Drawing Sheet

METROLOGICAL SCALE

BACKGROUND OF THE INVENTION

This invention relates to metrological scales, e.g. scales for use in opto-electronic scale-reading apparatus.

Such scales are known to comprise an elongate metallic scale member having alternate marks and spaces provided along its length. Our earlier International Patent Specification No. WO88/00331, now U.S. Pat. No. 4,926,566, describes such a scale, and a method of producing it by rolling. The scale described in that specification is in the form of a flexible tape having a substrate of spring steel which is relatively inextensible. A softer copper layer is provided on the upper and lower surfaces of the spring steel substrate. The marks and spaces of the scale are embossed in one of the copper layers by an embossing roller having a corresponding profile. The tape is embossed by passing it through a nip between this embossing roller and a support roller, which has a plain cylindrical surface.

Although the structure of the tape with a relatively inextensible substrate and a soft embossing layer allows the embossing to take place while at the same time providing the scale with some stability against longitudinal extension under the roller pressure, nevertheless there are inevitably strains introduced into the tape during the rolling process, however slight, as a result of the stresses caused by the rolling. For example, the embossed surface layer will be strained more than the other surface layer, resulting in bowing of the tape. As the tape emerges from the rollers, the stresses in the tape are relieved and there can be a very slight change in the local pitch of the scale as a result. The resulting errors can be cumulative.

SUMMARY OF THE INVENTION

The present invention has several aspects, each of which seek to reduce this effect.

One aspect of the present invention provides a method of producing a metrological scale wherein the scale comprises an elongate scale member having a reference plane and intended to have a periodic surface profile composed of alternate first and second surface regions which are elongate in a direction transverse to the length of the member and which differ regarding their position relative to the reference plane, the method comprising:

providing a rolling nip comprising two nip members both having profiles extending around their circumferences which consist of alternate raised and lowered portions, the profile of at least one nip member being the counterpart of said surface profile of the scale; and passing the scale member through the nip of the nip members while applying pressure therebetween thereby to deform opposing surfaces of the scale member in accordance with the respective profiles of the nip members.

In the first aspect of the invention, the two nip members are preferably rollers. The nip members preferably have profiles while cause substantially equal longitudinal strains in the opposing surfaces of the scale member. They may for example have identical profiles, although this is not essential.

Also preferably, the profiles of the nip members are symmetrical.

A second aspect of the invention provides a method of producing a metrological scale wherein the scale comprises an elongate scale member having a reference plane and intended to have a periodic surface profile composed of alternate first and second surface regions which are elongate in a direction transverse to the length of the member and which differ regarding their position relative to the reference plane, the method comprising passing the member between two nip members, at least one of which is a roller having a profile which is the counterpart of the surface profile of the scale, while applying pressure between the nip members, thereby to deform one surface of the scale member in accordance with said profile, characterised in that said roller is freely rotatable.

In the second aspect of the invention, the other nip member may be another roller, and the drive to cause the scale member to pass through the nip of the rollers may be provided by rotatably driving said other roller. The other said roller may be a plain cylindrical roller, or it may have a profile as described above in respect of the first aspect of the invention.

Further aspects of the invention include a metrological scale having a double-sided profile.

In the various above aspects, the first and second surface regions, which extend transversely, will normally extend at right angles to the longitudinal direction. However, surface regions extending transversely at other angles to the longitudinal direction are not excluded.

BRIEF DESCRIPTION OF THE DRAWINGS

An example of the different aspects of the invention will now be described with reference to the accompanying drawings, wherein.

DETAILED DESCRIPTION OF THE PREFERRED EMBODIMENTS

Figure 1:
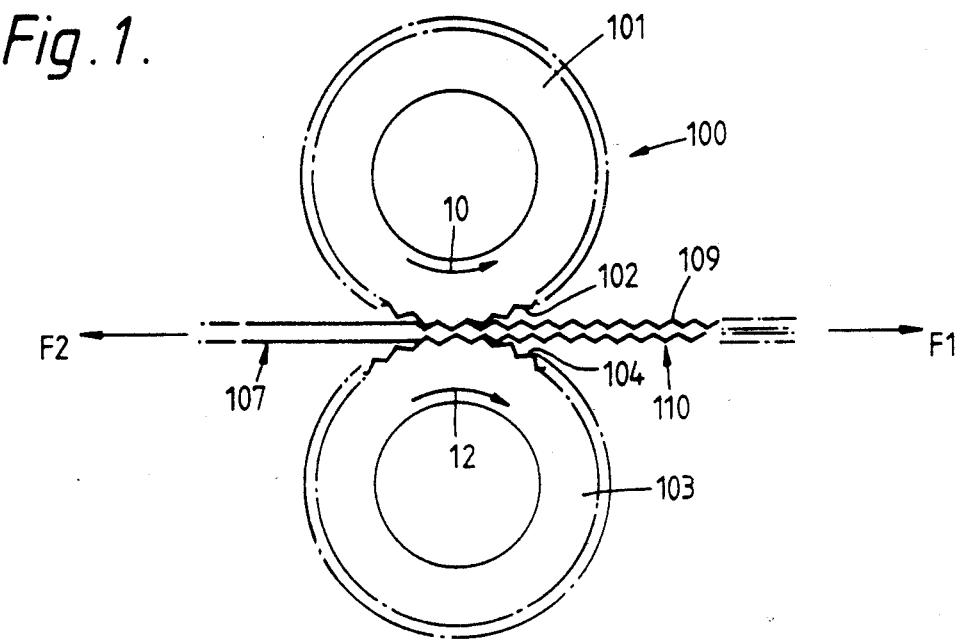
FIG. 1 is a diagrammatic illustration of a rolling apparatus and a scale being rolled in accordance with the method of the invention.

Referring to the drawings, the example shown is an improvement of that shown in International Specification No. WO88/0331, now U.S. Pat. No. 4,926,566, to which reference should be made for further information.

Figure 2:
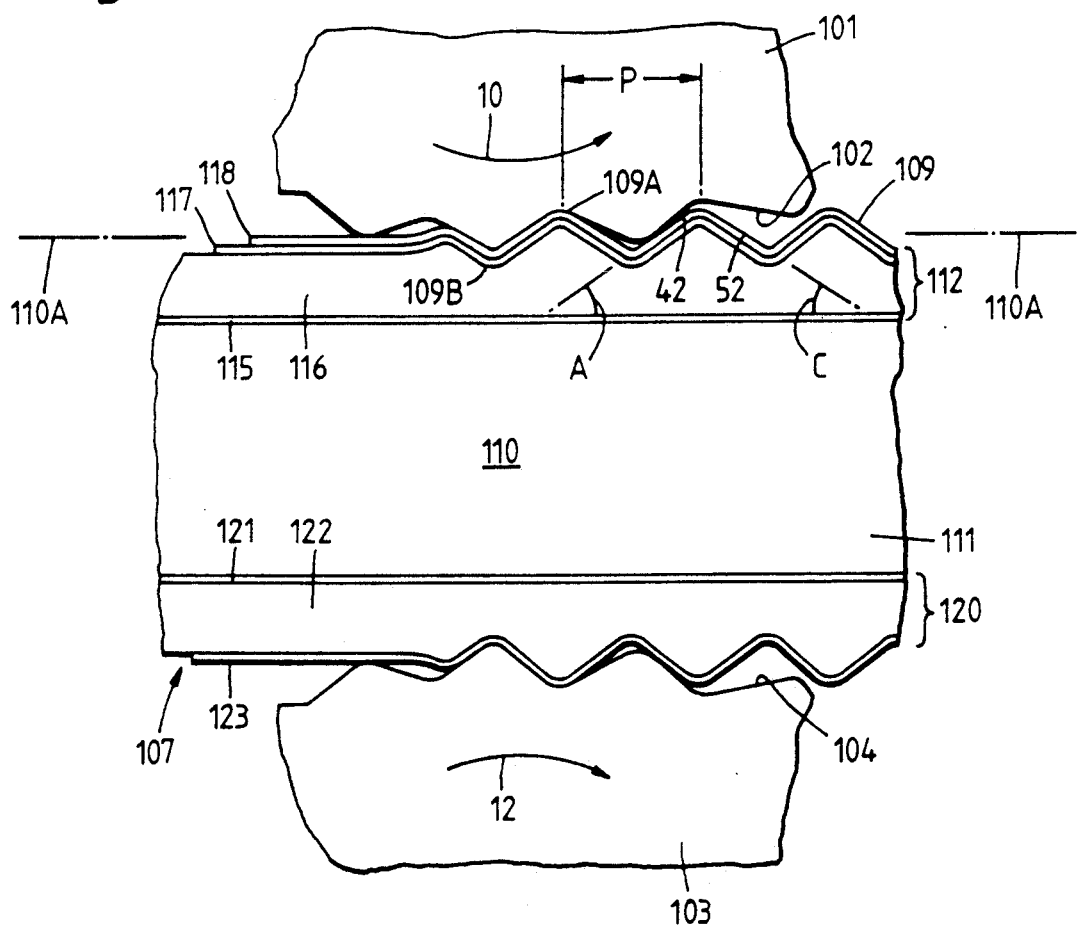
FIG. 2 is an enlarged detail of FIG. 1.

The rolling apparatus, denoted 100, comprises an upper embossing or form roller 101, and a lower support or impression roller 103. Means, not shown and understood per se, are provided for adjusting the pressure between the rollers 101,103. A scale 110 is required to have a scale profile 109 defined by alternate first and second surfaces 42,52 and (FIG. 2) positioned to define angles A,C relative to a reference plane 110A. The scale profile 109 is a periodic structure having a pitch P which may be of the order of 0.020 mm. The embossing roller 101 has a roller profile 102 around its circumference which is the counterpart of the scale profile 109. In operation, a blank 107 of the scale 110 is passed between the rollers and the profile of the embossing roller is impressed into the surface of the scale. Thus the roller 101 determines the profile 109 and the pitch P. The roller profile 102 may be produced by diamond cutting a cylindrical blank with the appropriate precision. The support roller 103 likewise has a roller profile 104 around its circumference which matches the profile of the embossing roller, for reasons described below.

The scale 110 is an elongate flexible member or tape comprising a substrate 111 and two opposing surface layers or profile layers 112,120 made of a material softer than that of which the substrate 111 is made. The relationship between roller pressure, roller profile and the relative hardnesses of the substrate 111 and the profile layers 112, 120 are so chosen that only the profile layers are significantly plastically deformed by the rollers and that the substrate 111 does not undergo any significant plastic deformation. Thereby the substrate 111 provides stability against roller pressure in the sense that the scale will not undergo significant extension in the direction of its length due to rolling. This is of particular advantage if the scale is relatively long, say 1 m or more, because the effect of said extension would be cumulative. Also by being softer and more pliable, the profile layer 112 is better able to accept the precisely defined profile of the roller 101 without hysteresis while the tougher substrate provides the mechanical strength necessary generally to avoid damage in production and installation. Further ways of improving the stability of the scale pitch produced by the rolling are described below.

In the present example the substrate 111 is made of spring steel tape about 0.1 mm thick and 6 mm wide. The profile layer 112 is basically made of copper and has a thickness of about 0.009 mm. Thus the profile layer 112 can readily be deformed to have a said profile 109 whose highest and lowest points 109A,109B lie within a height of 0.005 mm, preferably 0.003 mm. The rolling pressure should not be too great; it should cause the profile 109 to extend only partly into the original thickness of the layer 112 so as to leave a satisfactory thickness between the lowest point 109B and the substrate 111.

In the present example, the layer 112 is a composite comprising, in succession from the substrate 111, a layer 115 of cyanide copper about 0.0002 mm thick, a layer 116 of acidic copper about 0.009 mm thick, a layer 117 of nickel about 0.0005 mm thick, and a layer 118 of gold about 0.0005 mm thick. The layer 115 is introduced to protect the steel of the substrate against diffusion by the acidic copper of the layer 116. The layer 115 may be any other metal, e.g. nickel, capable of fulfilling this function. Alternatively, the layer 115 maybe left out if the layer 116 itself is made of cyanide copper. However, acidic copper may be preferred for the layer 116 because it tends to have a bright, reflective finish, at least before rolling, whereas the cyanide copper has a dull finish less suitable for an optical scale. The gold layer 118 may be introduced to provide reflectivity in the case of the layer 116 not being of sufficient reflectivity by itself. The nickel layer 117 forms a base for the gold layer 118, acting as a barrier against diffusion of copper into the gold, which could reduce the reflectivity.

Alternatively, the nickel layer 117 protects the layer 116 against oxidation if the gold layer is not introduced. The layers 115 to 118 may be applied to the substrate 111 by any known method, e.g. electro-plating, electroless plating or pressure bonding.

The profile layer 120 on the opposite side of the tape is a composite layer substantially the same as the layer 112, comprising in succession a layer 121 of cyanide copper, a layer 122 of acidic copper and a layer 123 of nickel. The final gold layer, however, may be omitted as shown because high reflectivity is not required of the underside of the scale.

The profile layer 120 is given an identical scale profile pattern to the layer 112, by means of the profile 104 of the support roller 103. Because both rollers have teeth the peaks or teeth of the two rollers engage the blank 107 substantially simultaneously as the blank is rolled through the nip of the rollers, so that any bending forces introduced into the blank and any consequential distortion of the tape as it feeds through the nip are minimised. However, the substantially simultaneous engagement of the teeth of two rollers is not essential. Neither is it essential to have identical roller profiles. The most important feature is that the two rollers introduce substantially equal plastic strains into the layers 112,120. Other combinations of roller profiles which achieve this result can be used.

The drive to the nip is provided by driving only the support roller 103. The impression roller 101 is arranged to be freely rotatable, and rotates in the direction of the arrow 10 under the action of the tape passing through the nip, which in turn is driven by rotation of the roller 103 in the direction of the arrow 12. Because the impression roller 101 is not driven, but is freely rotatable, it means that it minimises the forward or backward force exerted on the layer 112 as it impresses the scale profile into it. Thus, it does not tend to introduce shear forces into the layer 112 during the impression process.

Moreover, we prefer to have a symmetrical profile 102 (in which the angles A and C are equal). Thus, as a tooth of the profile 102 is pushed into the layer 112, copper of the layer 116 is pushed equally forwards and backwards by the profile of the tooth. Hence there is no net force forwards or backwards caused by the impression roller. It follows that since there are no such shear forces on the copper layer 112, no distortion of the scale profile is caused by relaxation as such forces are relieved on exit from the nip.

Because both the impression roller 101 and the support roller 103 have toothed profiles, which preferably give equal plastic strains to the layers 112,120, this contributes to proper drive of the tape through the nip by the rotation of the roller 103 in the direction of the arrow 12. If the roller 103 has a plain cylindrical surface (as shown in International Specification No. W088/00331) then the drive imparted to the tape is frictional. Because of variations in the surface condition of the tape and the roller, it is inevitable that the friction will be variable, and this can cause stick-slip. This in turn means that the speed of the tape through the nip will not be uniform, and more importantly that the forward force on the tape as it passes through the nip varies. Both of these effects cause distortion of the impressed scale profile 109 (and in particular variable pitch P from place to place, as the variable shear forces relax). The use of similar roller profiles 102,0104, ensures that the Poisson effect (the squeezing of the material of the tape forwards, backwards and sideways by the pressure of the nip) is governed by the grip of a toothed roller 103, not by the friction of a plain roller. THe Poisson effect is therefore more constant, for a given nip load, and does not tend to cause variable pitch P.

The nip load between the two rollers can advantageously be made adjustable. Adjusting the load varies the Poisson effect, and this can be used to adjust the pitch P to the desired value. Once correctly adjusted, the load should thereafter be kept constant, to ensure that the pitch remains constant.

As a further preferred feature, the tape 107 and resulting scale 110 may be given equal tension F1 and F2 forwards and backwards during the rolling process. Suitable tensioning devices are well known. The equal and opposite tensions help to ensure that there is no net forwards or backwards shear force introduced as the teeth of the profile 102 are impressed into the layer 112.

Advantageously the tape may be subjected to a further stress relieving process after the embossing process to remove residual stresses.

Although in the embodiment described above, only the support roller is driven, it is of course possible to achieve the results of the invention by driving either or both rollers, or by feeding the tape through the rollers which may or may not be driven at the same time.

We claim:

1. A method of producing a metrological scale wherein the scale comprises an elongate scale member having a reference plane, opposing faces parallel to the reference plane, and intended to have a periodic surface profile in one of the opposing faces composed of alternate first and second surface regions which are elongate in a direction transverse to the length of the member and which differ regarding their position relative to the reference plane, the method comprising:

providing a rolling nip comprising two nip members both having profiles extending around their circumferences which consist of alternate raised and lowered portions, the profile of at least one nip member being the counterpart of said surface profile of the scale; and passing the scale member through the nip of the nip members while applying pressure therebetween thereby to deform opposing faces of the scale member in accordance with the respective profiles of the nip members.

2. A method according to claim 1 wherein the two nip members are rollers.

3. A method according to claim 1 wherein the two nip members have profiles which cause substantially equal longitudinal strains in the opposing faces of the scale member.

4. A method according to claim 3 wherein the two nip members have substantially identical profiles.

5. A method according to claim 1 wherein the profiles of the nip members are substantially symmetrical.

6. A metrological scale comprising an elongate scale member having a reference plane and two opposing faces, both faces having a respective periodic surface profile composed of alternate first and second surface regions which are elongate in a direction transverse to the length of the member and which differ regarding their postition relative to the reference plane.

7. A scale according to claim 6, in which the scale member comprises a substrate, and two layers of a softer material than the substrate, one said layer on each face of the substrate, said surface profiles being provided in said softer layers.

8. A method of producing a metrological scale wherein the scale comprises an elongate scale member having a reference plane and intended to have a periodic surface profile composed of alternate first and second surface regions which are elongate in a direction transverse to the length of the member and which differ regarding their position relative to the reference plane, the method comprising passing the member between two nip members, at least one of which is a freely rotatable roller having a profile which is the counterpart of the surface profile of the scale, while applying pressure between the nip members, thereby to deform one face of the scale member in accordance with said profile.

9. A method according to claim 8, wherein the other nip member is another roller, and the method further includes rotatably driving the other roller to cause the scale member to pass through the nip of the rollers.

10. A method according to claim 9, wherein said other roller is a plain cylindrical roller.

11. A method according to claim 9, wherein said other roller also has a periodic surface profile.

* * * * *